(12) United States Patent
Dziekonski (10) Patent No.: US 9,452,639 B2
(45) Date of Patent: Sep. 27, 2016

(54) AXLE SHAFT SYSTEM FOR USE WITH GO-KARTS AND OTHER VEHICLES

(71) Applicant: Mitchell Z. Dziekonski, Sugar Land, TX (US)

(72) Inventor: Mitchell Z. Dziekonski, Sugar Land, TX (US)

(*) Notice: Subject to any disclaimer, the term of this patent is extended or adjusted under 35 U.S.C. 154(b) by 449 days.

(21) Appl. No.: 13/681,831

(22) Filed: Nov. 20, 2012

(65) Prior Publication Data

US 2014/0139012 A1 May 22, 2014

(51) Int. Cl.
| | |
|---|---|
| *B60B 35/00* | (2006.01) |
| *B60B 35/02* | (2006.01) |
| *B60B 35/12* | (2006.01) |
| *B60B 35/14* | (2006.01) |

(52) U.S. Cl.
CPC ............ *B60B 35/00* (2013.01); *B60B 35/003* (2013.01); *B60B 35/02* (2013.01); *B60B 35/12* (2013.01); *B60B 35/14* (2013.01); *B60B 2360/10* (2013.01); *B60Y 2200/114* (2013.01); *Y10T 29/49826* (2015.01)

(58) Field of Classification Search
CPC ..... B60B 35/00; B60B 35/02; B60B 35/025; B60B 35/04; B60B 35/14
USPC ...................................... 301/124.1, 125, 129
See application file for complete search history.

(56) References Cited

U.S. PATENT DOCUMENTS

| | | | | |
|---|---|---|---|---|
| 3,052,107 | A | * | 9/1962 | Kempf .................... F16F 15/10 464/180 |
| 4,043,147 | A | * | 8/1977 | Wiebe ..................... F01D 5/027 415/104 |
| 4,200,326 | A | | 4/1980 | Wilcox |
| 4,729,455 | A | * | 3/1988 | May .............................. 188/58 |
| 4,838,833 | A | * | 6/1989 | Coursin .................. F16C 3/026 464/181 |
| 5,603,554 | A | | 2/1997 | Monroe et al. |
| 5,855,416 | A | | 1/1999 | Tasker et al. |
| 6,086,162 | A | * | 7/2000 | Pinch et al. ............... 301/124.1 |
| 6,210,299 | B1 | | 4/2001 | Yoshioka |
| 6,234,911 | B1 | * | 5/2001 | Breese .................. F16F 15/322 464/183 |
| 6,585,331 | B2 | * | 7/2003 | Varela .......................... 301/125 |
| 6,863,462 | B1 | | 3/2005 | Snow |
| 7,377,598 | B2 | * | 5/2008 | Doud et al. ................... 301/137 |
| 7,530,582 | B2 | | 5/2009 | Truchsess et al. |
| 7,543,895 | B2 | | 6/2009 | Burkett |
| 7,604,562 | B2 | | 10/2009 | Gumpoldsberger |
| 2004/0256910 | A1 | | 12/2004 | Chalin et al. |

* cited by examiner

*Primary Examiner* — Jason Bellinger

(57) ABSTRACT

Axle shaft assemblies for use with a vehicle include a tubular shaft formed from a material having a first modulus of elasticity. A first insert is positioned within the longitudinal cavity of the shaft at a first end, the first insert having a thickness adapted to provide the first end tubular shaft with a greater modulus of elasticity for providing a suspension characteristic to the vehicle. A second insert having the selected thickness is positioned at a second end of the shaft. Interchangeability of the inserts enables a single lightweight shaft of generally thin, continuous wall thickness to be adapted with a variety of suspension characteristics, without replacing the shaft itself, while the low modulus of elasticity of the shaft facilitates the flexibility of the axle assembly and the ability of the axle to withstand impacts without deformation.

20 Claims, 4 Drawing Sheets

AXLE SHAFT SYSTEM FOR USE WITH GO-KARTS AND OTHER VEHICLES

FIELD

Embodiments usable within the scope of the present disclosure relate, generally, to configurations for vehicle axles, and more specifically, to axle shaft systems usable with go-karts and other lightweight and/or racing vehicles for providing desired characteristics thereto.

BACKGROUND

Piloting of go-karts and other, similar lightweight/racing vehicles is a profession from which many future drivers of professional racing vehicles are recruited, as well as a recreational pastime. As such, many modern go-karts can exceeds speeds of one hundred miles per hour, and various methods have been developed for decreasing the weight of go-karts while improving their performance, and while remaining within the bounds of what is permitted by various regulations.

For example, in a typical go-kart, the front axle is engaged with a steering mechanism for allowing turning of the vehicle, while the rear axle is engaged with the drive train and motor, to receive torque therefrom to turn the wheels. The axle represents a key portion of a go-kart frame, because the weight of the axle must be sufficiently heavy to retain the wheels in contact with the track, but sufficiently light to enable the axle to be turned/accelerated rapidly and to avoid adding excessive weight to the vehicle frame as a whole. Further, the axle must be sufficiently stiff and durable to withstand side impacts without becoming bent and/or warped, but sufficiently flexible to provide the vehicle frame with suspension characteristics suitable for the track on which the go-kart is driven.

No single axle will be suitable for every situation. Therefore, many go-kart drivers will travel with a set of multiple rear axles (e.g., seven shafts), each axle shaft consisting essentially of an elongate steel cylinder, and each shaft having a slightly different wall thickness. A thicker shaft would generally be used on a flatter track, where the weight and stiffness of the shaft would ensure that a maximum of contact is maintained between the wheels and the track, while a thinner shaft would be used on a less flat track, where the flexibility of the shaft would assist the suspension of the vehicle. At times, a driver may exchange axle shafts in the middle of a race if a selected shaft proves disadvantageous or unsuitable.

Purchasing and transporting multiple steel axle shafts can be cumbersome, and changing shafts, especially during a race, can be time-consuming. Additionally, independent of the wall thickness of an axle shaft, conventional shaft systems are subject to the limitations of steel materials. Steel is an unavoidably heavy material, especially when thicker shafts are required to provide desired suspension characteristics. Furthermore, a steel shaft will be permanently deformed by a substantial side impact, independent of the selected wall thickness.

A need exists for systems and methods that can enable a single axle shaft to be provided with multiple suspension characteristics (e.g., variable flexibility, weight, stiffness, and/or thickness), thereby enabling the axle shaft to be adapted for multiple types of track and racing conditions.

A need also exists for systems and methods that utilize lightweight, high strength materials, having a lower modulus of elasticity than conventional steel alloys, thereby providing axle shafts that safely withstand side impacts without deformation, provide desirable suspension characteristics, and are able to be rotated/accelerated more rapidly than conventional axles without adding significant weight to a vehicle.

Embodiments usable within the scope of the present disclosure meet these needs.

SUMMARY

Embodiments usable within the scope of the present disclosure include an axle shaft assembly usable for a vehicle (e.g., a go-kart, a lightweight racing vehicle, or other types of vehicles). While embodiments are described herein with specific reference to go-karts and rear axles thereof, it should be understood that the disclosed axle shaft assemblies can be used in place of any conventional axle and/or shaft, including front axles, rear axles, engine axles, or any other elongate portion of a vehicle intended to transmit or receive torque.

Specifically, an axle shaft assembly can include a tubular shaft having a first end, a second end, a central portion, and a longitudinal cavity extending between the first and second ends, the tubular shaft being formed from a material having a first modulus of elasticity. For example, in a preferred embodiment, the tubular shaft can be formed from titanium and can be provided with a constant, generally thin wall thickness. Titanium provides a high strength, flexible axle shaft that resists deformation, and is lighter than conventional steel components, enabling more rapid acceleration and a faster overall speed.

A first insert can be positioned within the longitudinal cavity at the first end of the tubular shaft, and a second insert can be positioned at the second end. The inserts can each be provided with a wall thickness such that when placed within the tubular shaft, the effective wall thickness of the portion of the tubular shaft occupied by the inserts is modified. The modified wall thickness can provide the end portions of the tubular shaft with a modulus of elasticity greater than that of the shaft alone, thereby providing desired suspension characteristics to the vehicle. Both the first and second inserts can be formed from any desired materials, such that the inserts provide the axle with a desired stiffness and weight. In an embodiment, the inserts can be formed from aluminum, though it should be understood that any alternate material able to increase the effective thickness of the end portions of the shaft could be used, including steel, composite, wood, one or more metals, one or more alloys, one or more polymers, or combinations thereof. The combination of a high strength material (e.g., titanium) used in the external shaft can enable inserts made from lighter and/or lower density materials to be used. Use of aluminum and/or other materials having a lower density or lighter weight than conventional steel can reduce the overall weight of the axle shaft assembly, enabling greater acceleration and speed.

The inserts can be engaged within the tubular shaft through the interlocking of one or more protrusions extending from either the tubular shaft or inserts, within corresponding orifices formed in the other component. In a preferred embodiment, the length of the first and second inserts can be limited such that the first insert overlaps a first portion of the tubular shaft proximate to the first end, and the second insert overlaps a portion of the tubular shaft proximate to the second end, while the central portion of the tubular shaft provides the shaft with a desired flexibility, impact resistance, and reduced weight. The portions of the shaft occupied by the inserts provide the shaft with the selected stiffness/flexibility and suspension characteristics.

As such, an embodiment of an axle shaft system usable to provide a vehicle with variable suspension characteristics can include a single tubular shaft, as described above, the shaft, for example, being formed from a first material having a first modulus of elasticity (e.g., a titanium shaft having a generally uniform, thin wall thickness). A first pair of inserts can be placed in the longitudinal cavity of the tubular shaft at the first and second ends thereof, the first pair of inserts each having a first thickness adapted to provide the shaft with a second modulus of elasticity greater than the first thereby providing the end portions of the shaft with selected flexibility and suspension characteristics. The inserts can be formed from alternate lightweight materials (e.g., aluminum inserts having a desired wall thickness). A second pair of inserts can also be usable for placement in the longitudinal cavity, each of the second pair of inserts having a second thickness different from the first, adapted to provide the shaft with a third modulus of elasticity and corresponding suspension characteristics. The second pair of inserts can be formed from the same material as the first, or a differing material if different material properties are desired. The first and second pairs of inserts can be removably and interchangeably engaged with the tubular shaft, and exchanged as desired. One or more additional pairs of inserts can also be provided, each additional pair having a selected thickness and/or material that differs from the other pairs of inserts, enabling a single axle shaft to be provided with a variety of stiffness, flexibility, and/or weight, thus providing a vehicle with a variety of suspension characteristics, enabling the axle shaft to be adapted for multiple types of track and racing conditions.

BRIEF DESCRIPTION OF THE DRAWINGS

In the detailed description of various embodiments usable within the scope of the present disclosure, presented below, reference is made to the accompanying drawings, in which.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," "above," "below," and so forth are made only with respect to explanation in conjunction with the drawings, and that the components may be oriented differently, for instance, during transportation and manufacturing as well as operation. Because many varying and different embodiments may be made within the scope of the concepts herein taught, and because many modifications may be made in the embodiments described herein, it is to be understood that the details herein are to be interpreted as illustrative and non-limiting.

As described above, embodiments usable within the scope of the present disclosure relate to axle shaft assemblies, systems, and methods that include use of a single tubular shaft (e.g., a titanium axle having a generally thin, constant wall thickness) within which inserts having a selected wall thickness, that can be formed from an alternate material (e.g., aluminum), can be positioned (e.g., at the ends thereof) to provide selected regions of the resulting axle assembly with an effective wall thickness, while retaining the flexibility and impact resistance of the other portions of the axle assembly (e.g., the central portion thereof). The modular and interchangeable nature of the inserts enables a single tubular shaft to be used, in combination with any desired inserts having selected dimensions (e.g., length, thickness) and materials (e.g., aluminum, wood, steel, composite, metals, alloys, polymers, etc.), and further enables inserts to be interchanged rapidly and efficiently, such as during a racing event. Such axle shaft assemblies, systems, and methods, while especially useful as rear (e.g., driving) axles of go-karts and similar lightweight racing vehicles, are usable with any type of vehicle, and with any type of axle (e.g., front/steering axles, engine axles, or any other elongate portion of a vehicle designed to receive and/or transmit torque).

Figure 1A:
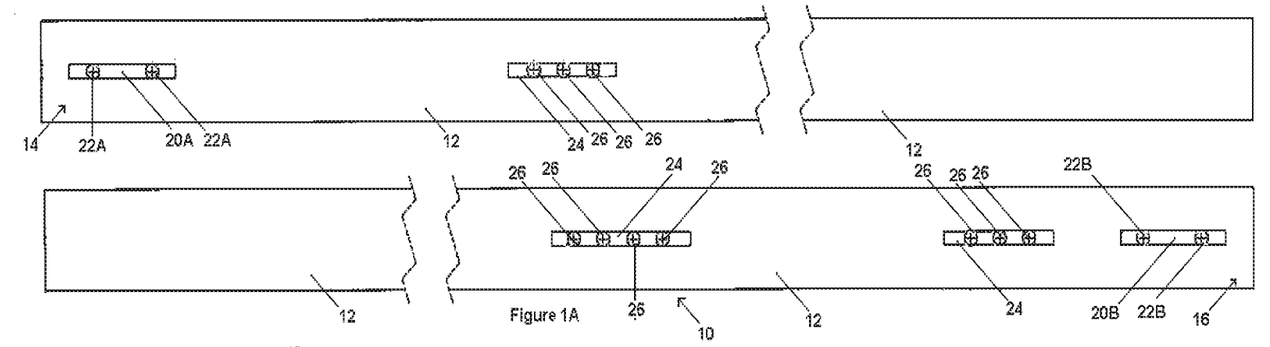
FIG. 1A depicts a diagrammatic side view of an embodiment of a tubular shaft usable within the scope of the present disclosure.
Figure 1B:
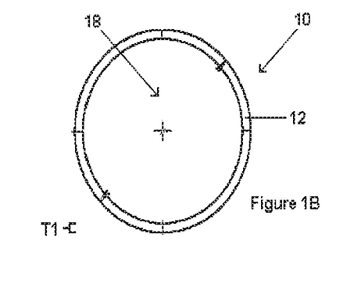
FIG. 1B depicts a diagrammatic end view of the tubular shaft of FIG. 1A.

Referring now to FIGS. 1A and 1B, diagrammatic side and end views, respectively, of a tubular shaft (10) usable within the scope of the present disclosure are shown. The tubular shaft (10) includes a generally cylindrical body (12) having a first end (14), a second end (16) and a longitudinal cavity (18) extending between the ends (14, 16). In a preferred embodiment, the tubular shaft (10) can be formed from titanium, though it should be understood that any generally lightweight, high strength material having a generally low modulus of elasticity can be used to form the tubular shaft (10) without departing from the scope of the present disclosure. The depicted tubular shaft (10) is shown having a constant wall thickness (T1) throughout its length; however, in various embodiments, the inner or outer surfaces of the shaft (10) could be provided with protrusions, shoulders, tapers, and/or regions of greater or lesser thickness to provide increased or decreased weight and/or flexibility/stiffness to various portions of the shaft (10). However, an advantage of the embodied modular systems, assemblies, and methods described herein, and an advantage of the use of low modulus materials to form the tubular shaft (10) is the ability to utilize a generally straight shaft having a constant wall thickness, which facilitates manufacture and reduces cost.

The depicted tubular shaft (10) includes a first connection region (20A) proximate to the first end (14), which can include one or more pins (22A) extending therefrom (e.g., into the longitudinal cavity (18)). Similarly, a second connection region (20B) is shown proximate to the second end (16) having pins (22B) extending therefrom. The pins (22A, 22B) can be engaged within corresponding orifices of modular inserts, as described above and below. It should be understood that the depicted configuration is merely exemplary, and that in other embodiments, the tubular shaft (10) could include orifices within which pins extending from the outer surface of inserts can be engaged. Alternatively and/or additionally, inserts could be retained within the tubular shaft (10) via a friction fit or similar methods, such that a mechanical connection utilizing pins and orifices is not necessary.

The tubular shaft (10) is further shown having three additional connecting regions (24) from which pins (26) can extend, the additional connecting regions (24) being usable to engage additional orifices within inserts to provide a more secure connection, or alternatively, to engage the tubular shaft (10) to other portions of a vehicle. For example, the depicted tubular shaft (10) could be used as part of a rear axle of a go-kart, while one or more of the additional connecting regions (24) are used to engage the rear axle to other portions of the go-kart frame.

While tubular shafts usable within the scope of the present disclosure can have any shape, dimensions, and/or materials, depending on the characteristics of the vehicle with which the tubular shaft (10) is used, the purpose for which the vehicle and/or shaft (10) is used, and other similar factors, the depicted tubular shaft (10) is formed from titanium, having a length of about 40.19 inches, an outer diameter of about 1.916 inches, and an inner diameter of about 1.790 inches (a wall thickness of 0.179 inches.) The position of the connecting regions (20A, 20B, 24) and pins (22A, 22B, 26) can vary depending on the location of corresponding orifices and/or similar features on inserts intended for use with the shaft (10) and/or the position, dimensions, and/or other characteristics of other portions of the vehicle to which the shaft (10) is to be engaged.

Figure 2A:
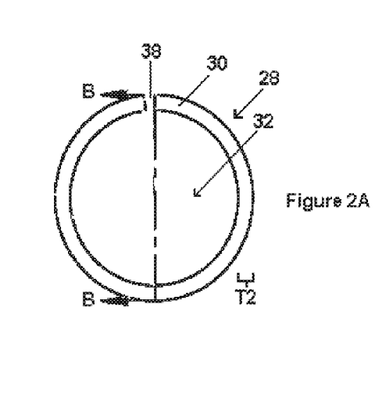
FIG. 2A depicts an end view of an embodiment of a first insert usable within the scope of the present disclosure.
Figure 2B:
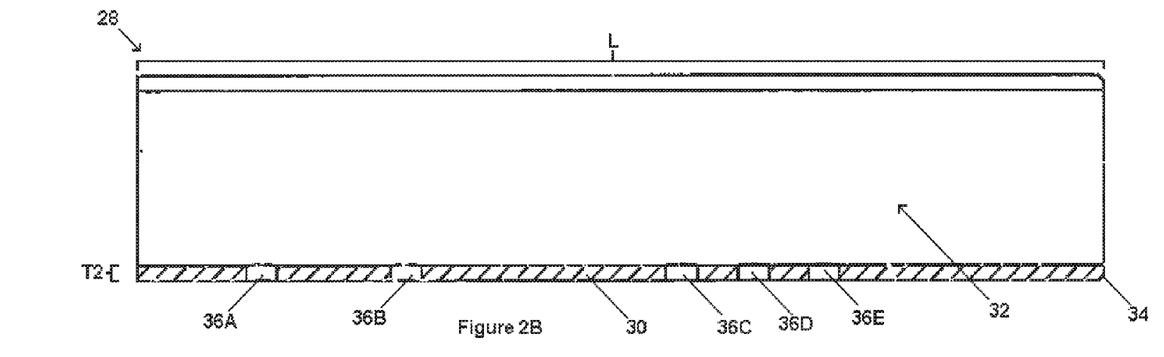
FIG. 2B depicts a partial cross-sectional view of the first insert taken along line B of FIG. 2A.

FIGS. 2A and 2B depict an embodiment of an insert (28) usable within the scope of the present disclosure. Specifically, FIG. 2A depicts an end view of the insert (28), while FIG. 2B depicts a partial cross-sectional view thereof, taken along line B of FIG. 2A. As described above, the depicted insert (28) can be positioned within the longitudinal cavity (18, shown in FIGS. 1A and 1B) of the tubular shaft (10, shown in FIGS. 1A and 1B) (e.g., at an end thereof) to provide at least a portion of the shaft with an effective wall thickness greater than the thickness of the tubular shaft alone, and to provide a portion of the shaft with a selected weight and flexibility/stiffness, determined by the dimensions and material characteristics of the insert (28).

The depicted insert (28) includes a generally cylindrical body (30) having a longitudinal cavity (32) and a tapered shoulder (34) (e.g., a 45 degree shoulder) at an end thereof to facilitate insertion and/or removal of the insert (28) from the tubular shaft. In a preferred embodiment, the insert (28) can be formed from aluminum, though it should be understood that any generally durable material able to hold its shape and provide the axle shaft assembly with an effective wall thickness can be used, including, without limitation, steel, wood, composite, and/or other metals, alloys, and/or polymers. The depicted insert (28) is shown having a length (L) and a generally constant wall thickness (T2) throughout its length; however, in various embodiments, the inner or outer surfaces of the insert (28) could be provided with protrusions, shoulders, tapers, and/or regions of greater or lesser thickness to provide increased or decreased weight and/or flexibility/stiffness to various portions thereof. In use, when the insert (28) is placed within a tubular shaft, the total thickness of the assembly (e.g., the thickness of the tubular shaft plus the thickness of the insert) creates an overall thickness for a portion of the assembly, which, in combination with the material characteristics of the shaft and insert, provides a desired weight, stiffness, and/or suspension characteristic to at least a portion of the resulting axle assembly.

Within the body (30) of the insert (28), a series of five orifices (36A, 36B, 36C, 36D, 36E) are shown, each of which can engage a corresponding pin within the tubular shaft (10, shown in FIGS. 1A and 1B) to secure the insert (28) therein. For example, the depicted orifices are positioned such that the first and second orifices (36A, 36B) can be engaged by pins (22A, 22B, shown in FIG. 1A) within the first engagement region (20A, shown in FIG. 1A), while the third, fourth, and fifth orifices (36C, 36D, 36E) can be engaged by pins (26, shown in FIG. 1A) within the additional engagement region (24, shown in FIG. 1A) closest to the first engagement region. As described previously, however, use of a pin-in-hole arrangement is merely one, non-limiting method by which the insert (28) can be secured in a desired position, and any other means known in the art can be used without departing from the scope of the present disclosure. Further, while five orifices (36A, 36B, 36C, 36D, 36E) are shown, it should be understood that any number and configuration of protrusions and/or orifices can be used.

The body (30) of the insert (28) is shown having a small gap (38) within the circumference thereof, which is usable to enable insertion of the insert (28) within the longitudinal cavity (18, shown in FIGS. 1A and 1B) of the tubular shaft (10, shown in FIGS. 1A and 1B). For example, the presence of the gap (38) allows the insert (28) to be compressed (e.g., such that the ends of the body (30) on opposite ends of the gap (38) contact one another), thereby temporarily decreasing the diameter of the insert (28). The compressed insert can then be inserted into a longitudinal cavity, engaged with pins therein, and allowed to expand, such that the outer surface of the insert (28) contacts the inner surface of the shaft into which the insert (28) is positioned, further securing the insert (28) in place.

While inserts usable within the scope of the present disclosure can have any shape, dimensions, and/or materials, depending on the characteristics of the vehicle and axle assembly with which the insert (28) is used, the purpose for which the vehicle and/or axle assembly is used, and other similar factors, the depicted insert (28) is formed from aluminum, having a length of about 9.1 inches, an outer diameter of about 1.835 inches, and an inner diameter of about 1.556 inches (a wall thickness of 0.279 inches.) The position of the orifices (36A, 36B, 36C, 36D, 36E) can vary depending on the location of corresponding pins and/or similar features on the tubular shaft intended for use with the insert (28). The gap (38) can be generally narrow in width, occupying approximately 6 degrees (1.66 percent) of the circumference of the insert (28).

Figure 3A:
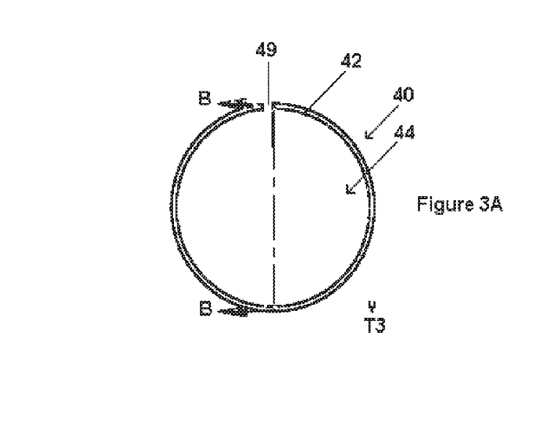
FIG. 3A depicts an end view of an embodiment of a second insert usable within the scope of the present disclosure.
Figure 3B:
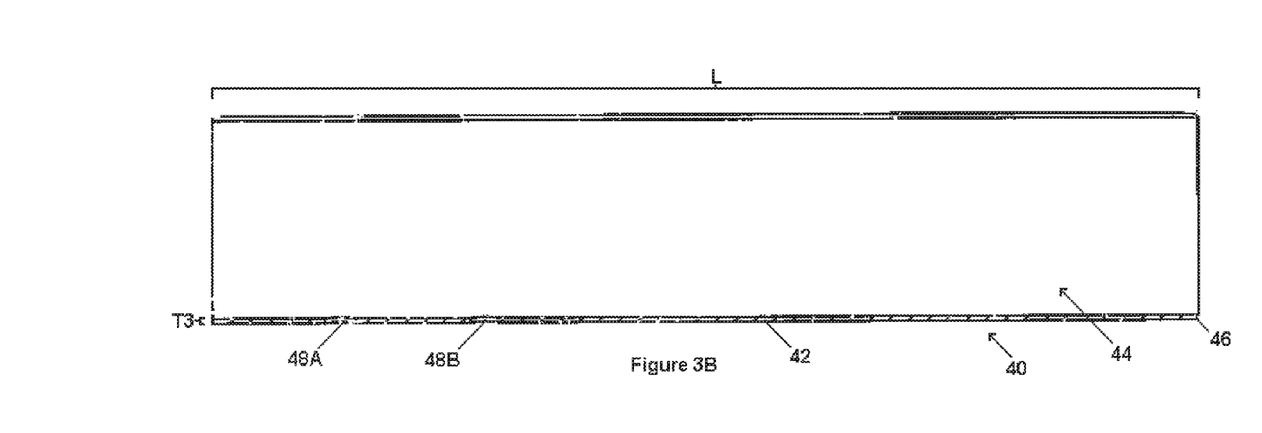
FIG. 3B depicts a partial cross-sectional view of the second insert taken along line B of FIG. 3A.

FIGS. 3A and 3B depict an alternate embodiment of an insert (40) usable within the scope of the present disclosure. Specifically, FIG. 3A depicts an end view of the insert (40), while FIG. 3B depicts a partial cross-sectional view thereof taken along line B of FIG. 3A. The depicted insert (40) and the insert (28, shown in FIGS. 2A and 2B) of FIGS. 2A and 2B can each be removably and interchangeably positioned within the tubular shaft (10, shown in FIGS. 1A and 1B) of FIGS. 1A and 1B, as described above and below.

The depicted insert (40) includes a generally cylindrical body (42) having a longitudinal cavity (44) and a tapered shoulder (46) at an end thereof. In a preferred embodiment, the insert (40) can be formed from aluminum, though it should be understood that any generally durable material, as described above, can be used, including a similar or different material than that used to form the insert of FIGS. 2A and 2B. The insert (40) is shown having a length (L) generally equal to that of the insert of FIGS. 2A and 2B, though in an embodiment, interchangeable inserts can be provided with differing lengths, such as when it is desirable to configure differing lengths of an axle shaft to have selected stiffnesses and/or suspension characteristics. The insert (40) is further shown having a generally constant wall thickness (T3), less than the thickness (T2, shown in FIG. 2B) of the insert of FIGS. 2A and 2B. In use, when the insert (40) is placed within a tubular shaft, the total thickness of the axle assembly (e.g., the thickness of the tubular shaft plus the thickness of the insert) creates an overall thickness for a portion of the assembly, which, in combination with the material characteristics of the shaft and insert, provides a desired weight, stiffness, and/or suspension characteristic to at least a portion of the resulting axle assembly.

The body (42) of the depicted insert (40) includes two orifices (48A, 48B) formed therein, the orifices being usable for engagement with corresponding pins in the tubular shaft (10, shown in FIGS. 1A and 1B). For example, the orifices (48A, 48B) can each accommodate pins (22B, shown in FIG. 1A) extending from the second engagement region (20B). While FIG. 3B depicts the insert (40) having only two orifices (48A, 48B), it should be understood that any number and configuration or protrusions and/or orifices can be used, and/or any other means of engagement between the insert (40) and a tubular shaft, as described previously. A small gap (49) within the circumference of the body (42) of the insert (40) is shown, which can be used to enable insertion of the insert (40) within a tubular shaft in a manner similar to that described above with regard to the insert of FIGS. 2A and 2B.

While inserts usable within the scope of the present disclosure can have any shape, dimensions, and/or materials, depending on the characteristics of the vehicle and axle assembly with which the insert (40) is used, the purpose for which the vehicle and/or axle assembly is used, and other similar factors, the depicted insert (40) is formed from aluminum, having a length of about 9.0 inches, an outer diameter of about 1.826 inches, and an inner diameter of about 1.740 inches (a wall thickness of 0.086 inches.) The position of the orifices (48A, 48B) can vary depending on the location of corresponding pins and/or similar features on the tubular shaft intended for use with the insert (40). The gap (49) can be generally narrow in width, occupying approximately 6 degrees (1.66 percent) of the circumference of the insert (28).

Figure 4A:
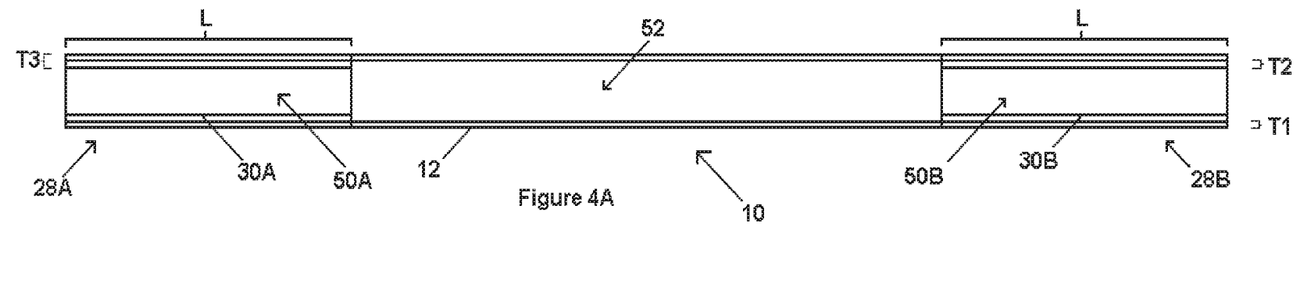
FIG. 4A depicts a diagrammatic side view of a modular axle shaft assembly usable within the scope of the present disclosure.
Figure 4B:
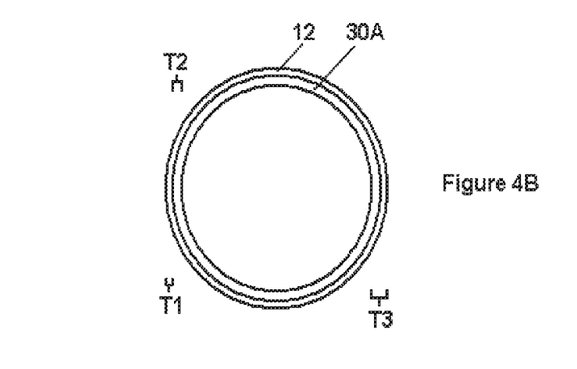
FIG. 4B depicts a diagrammatic end view of the modular axle shaft assembly of FIG. 4A.

FIGS. 4A and 4B depict diagrammatic side and end views, respectively, of an axle assembly usable within the scope of the present disclosure. The tubular shaft (10), having an elongate, generally cylindrical body (12) is shown, defining a longitudinal cavity therein. The body (12) of the depicted tubular shaft (10) has a generally thin and constant wall thickness (T1).

A first insert (28A) having a generally cylindrical body (30A) is shown inserted into a first end of the tubular shaft (10), the first insert (28A) having a selected length (L) and a wall thickness (T2). Similarly, a second insert (28B) having a generally cylindrical body (30B) is shown inserted into the opposing end of the tubular shaft (10), the second insert (28B) having a length (L) and wall thickness (T2) substantially equal to that of the first insert (28A). FIG. 4A depicts the first and second inserts (28A, 28B) having substantially identical dimensions and configurations; however, it should be understood that in various embodiments, two inserts having differing dimensions, positions, and/or material characteristics could be used.

The overlap between the first insert (28A) and the first end portion of the tubular shaft (10) defines a first end region (50A) of the axle shaft assembly, while the overlap between the second insert (28B) and the second end portion of the tubular shaft (10) defines a second end region (50B). The end regions have an effective wall thickness (T3) created by the overlapping wall thicknesses (T1, T2) of the shaft (10) and inserts (28A, 28B) (e.g., the sum of T1 and T2 is substantially equal to T3). The position of the inserts (28A, 28B) within the shaft (10) defines a central portion (52) of the axle shaft assembly unoccupied by the inserts (28A, 28B) due to the limited lengths (L) thereof. As such, in use, the central portion (52) provides the axle shaft assembly with a desirable flexibility, strength, and resiliency due to the limited thickness (T1) of the wall thereof, and due to the low modulus of elasticity of the material used (e.g., titanium). The end portions (50A, 50B) (e.g., the portions of the axle shaft that would generally be positioned over and/or in association with the wheels of a go-kart or similar vehicle) provide desirable portions of the axle shaft assembly with a selected stiffness, weight, and suspension characteristic, determined by the thickness (T3) of the end portions (50A, 50B) and the material characteristics of the shaft (10) and inserts (28A, 28B). When desired, the inserts (28A, 28B) can be removed and replaced with alternate inserts, having a differing wall thickness, material, and/or length, to provide alternate characteristics to the axle shaft.

As such, embodiments usable within the scope of the present disclosure enable a single axle shaft (e.g., a titanium shaft having a generally thin, uniform wall thickness) to be provided with multiple suspension characteristics (e.g., variable flexibility, weight, stiffness, and/or thickness), through the provision of inserts having selected wall thicknesses, materials, and/or lengths, thereby enabling the axle shaft to be adapted for multiple types of track and racing conditions. Use of an axle shaft assembly that incorporates lightweight, high strength materials, including materials having a lower modulus of elasticity than conventional steel alloys, enables the axle shaft to withstand side impacts without deformation and provide desirable suspension characteristics, while also providing an assembly that is significantly lighter than conventional alternatives, and is thus able to be rotated and accelerated more rapidly than conventional axles without adding significant weight to a vehicle, enabling a higher overall speed for the vehicle. Further, use of an axle shaft assembly that incorporates interchangeable, modular components enables a single tubular shaft with corresponding inserts to replace a conventional set of multiple steel shafts.

While various embodiments usable within the scope of the present disclosure have been described with emphasis, it should be understood that within the scope of the appended claims, the present invention can be practiced other than as specifically described herein.

What is claimed is:

1. An axle shaft assembly for a vehicle, the axle shaft assembly comprising:
   a tubular axle shaft having a first end, a second end, a central portion, a circumference and a longitudinal cavity extending between the first end and the second end, wherein the tubular axle shaft is formed from a material having a first modulus of elasticity, and wherein the tubular axle shaft is rotatable;
   a first insert positioned internal to the longitudinal cavity at the first end of the tubular axle shaft, wherein the first insert comprises a thickness adapted to provide the first end of the tubular axle shaft with an altered suspension characteristic throughout the circumference of the tubular axle shaft; and
   a second insert positioned internal to the longitudinal cavity at the second end of the tubular axle shaft, wherein the second insert comprises the thickness and is adapted to provide the second end of the tubular axle shaft with the altered suspension characteristic throughout the circumference of the tubular axle shaft,
   wherein the rotation of the tubular axle shaft transmits torque to at least one wheel of the vehicle.

2. The axle shaft assembly of claim 1, wherein the first insert comprises a first length that overlaps a first portion of the tubular axle shaft proximate to the first end, and the second insert comprises a second length that overlaps a second portion of the tubular axle shaft proximate to the second end, such that the central portion provides the tubular axle shaft with flexibility, impact resistance, and reduced weight, and the first portion and the second portion provide the tubular axle shaft with the selected flexibility for providing the altered suspension characteristic to the vehicle.

3. The axle shaft assembly of claim 1, wherein the tubular axle shaft comprises an interior surface having a first protrusion and a second protrusion extending therefrom, wherein the first insert has a first orifice formed therein, wherein the second insert has a second orifice formed therein, and wherein the first protrusion engages the first orifice and the second protrusion engages the second orifice, to secure the first insert and the second insert within the tubular axle shaft.

4. The axle shaft assembly of claim 3, wherein the tubular axle shaft further comprises an additional protrusion positioned between the first protrusion and the second protrusion, and wherein the additional protrusion is adapted to engage a frame member of the vehicle.

5. The axle shaft assembly of claim 1, wherein the tubular axle shaft has a first orifice and a second orifice formed therein, wherein the first insert has a first protrusion extending therefrom, wherein the second insert has a second protrusion extending therefrom, and wherein the first protrusion engages the first orifice and the second protrusion engages the second orifice, to secure the first insert and the second insert within the tubular axle shaft.

6. The axle shaft assembly of claim 1, wherein the tubular axle shaft is formed from titanium.

7. The axle shaft assembly of claim 6, wherein the first insert, the second insert, or both of the first insert and the second insert are formed from aluminum.

8. The axle shaft assembly of claim 6, wherein the first insert, the second insert, or both of the first insert and the second insert are formed from composite, wood, one or more metals, or one or more polymers.

9. An axle shaft system for providing a vehicle with variable suspension characteristics, the axle shaft system comprising:
   a tubular axle shaft having a first end, a second end, a central portion, a circumference, and a longitudinal cavity extending between the first end and the second end, wherein the tubular axle shaft is formed from a material having a first modulus of elasticity, and wherein the tubular axle shaft is rotatable;
   a first pair of inserts adapted for placement internal to the longitudinal cavity at the first end and the second end, wherein each insert of the first pair of inserts comprises a first thickness adapted to provide the first end and the second end with a first altered suspension characteristic throughout the circumference of the tubular axle shaft; and
   a second pair of inserts adapted for placement internal to the longitudinal cavity at the first end and the second end, wherein each insert of the second pair of inserts comprises a second thickness and adapted to provide the first end and the second end with a a second altered suspension characteristic throughout the circumference of the tubular axle shaft, and wherein the first pair of inserts and the second pair of inserts are removably and interchangeably positionable within the longitudinal cavity at the first and second ends to enable provision of variable suspension characteristics to the vehicle.

10. The shaft system of claim 9, further comprising at least one additional pair of inserts adapted for placement in the longitudinal cavity at the first end and the second end, wherein each insert of said at least one additional pair of inserts comprises a third thickness that differs from the first thickness and the second thickness for providing the tubular axle shaft with a third altered suspension characteristic throughout the circumference of the tubular axle shaft.

11. The shaft system of claim 9, wherein the tubular axle shaft comprises one of a protrusion or an orifice, and wherein at least one of said inserts comprises the other of the protrusion or the orifice, and wherein said at least one of said inserts is secured within the longitudinal cavity by engagement of the protrusion with the orifice.

12. The shaft system of claim 9, wherein the tubular axle shaft is formed from titanium.

13. The shaft system of claim 12, wherein the first pair of inserts, the second pair of inserts, or both pairs of inserts are formed from aluminum.

14. The shaft system of claim 12, wherein the first pair of inserts, the second pair of inserts, or both pairs of inserts are formed from composite, wood, one or more metals, or one or more polymers.

15. A method for providing a vehicle with an axle having selected suspension characteristics, the method comprising the steps of:
   positioning a first insert internally to a first end of a longitudinal cavity of a tubular axle shaft formed from a material having a first modulus of elasticity, wherein the first insert comprises a first thickness adapted to provide the tubular axle shaft with an altered suspension characteristic throughout a circumference of the tubular axle shaft;
   positioning a second insert internally to a second end of the longitudinal cavity, wherein the second insert comprises the first thickness and is adapted to provide the altered suspension characteristic throughout the circumference of the tubular axle shaft; and rotating the tubular axle shaft to transmit torque to at least one wheel of the vehicle.

16. The method of claim 15, wherein the step of positioning the first insert, the step of positioning the second insert, or both steps of positioning the first insert and the second insert, comprises engaging a protrusion extending from one of the tubular axle shaft or the first insert and the second insert with an orifice formed in the other of the tubular axle shaft and the first insert and the second insert to secure the first insert, the second insert, or combinations thereof within the tubular axle shaft.

17. The method of claim 15, further comprising the steps of:
removing the first insert and the second insert from the tubular axle shaft;
positioning a third insert within the first end of the longitudinal cavity, wherein the third insert comprises a second thickness for providing the first end of the tubular axle shaft with a second alternate suspension characteristic throughout the circumference of the tubular axle shaft; and
positioning a fourth insert within the second end of the longitudinal cavity, wherein the fourth insert comprises the second thickness and provides the second end of the tubular axle shaft with the second altered suspension characteristic.

18. The method of claim 15, wherein the step of positioning the first insert within the first end of the longitudinal cavity comprises overlapping a first portion of the tubular axle shaft proximate to the first end with the first insert, wherein the step of positioning the second insert within the second end of the longitudinal cavity comprises overlapping a second portion of the tubular axle shaft proximate to the second end with the second insert, thereby defining a central portion of the tubular axle shaft adapted to provide the tubular axle shaft with flexibility, impact resistance, and reduced weight, and wherein the first portion and the second portion provide the tubular axle shaft with the selected flexibility for providing the suspension characteristic to the vehicle axle.

19. The axle shaft assembly of claim 1, wherein the first insert, the second insert, or combinations thereof are formed from a material having a second modulus of elasticity different from the first modulus of elasticity.

20. The axle shaft assembly of claim 1, wherein the vehicle is a go-kart.

* * * * *